United States Patent [19]
Yamashita et al.

[11] Patent Number: 5,422,548
[45] Date of Patent: Jun. 6, 1995

[54] CUT-OFF VEHICULAR DISCHARGE LAMP CIRCUIT HAVING WAIT AND MONITOR MODES

[75] Inventors: Masayasu Yamashita; Atsushi Toda, both of Shimizu, Japan

[73] Assignee: Koito Manufacturing Co., Ltd., Tokyo, Japan

[21] Appl. No.: 120,467

[22] Filed: Sep. 14, 1993

[30] Foreign Application Priority Data

Sep. 16, 1992 [JP] Japan .................. 4-070405 U

[51] Int. Cl.6 .............................................. G05F 1/00
[52] U.S. Cl. ........................... 315/308; 315/224; 315/77; 315/82; 315/DIG. 7
[58] Field of Search ............. 315/127, 209 R, 77, 315/82, 291, 307, 308, 224, DIG. 7

[56] References Cited

U.S. PATENT DOCUMENTS

| | | | |
|---|---|---|---|
| 3,999,100 | 12/1976 | Dendy et al. | 315/308 |
| 4,667,129 | 5/1987 | Papillon | 315/82 |
| 4,952,849 | 8/1990 | Fellows et al. | 315/307 |
| 5,049,790 | 9/1991 | Herfurth et al. | 315/291 |
| 5,051,660 | 9/1991 | Domann et al. | 315/219 |
| 5,097,181 | 3/1992 | Kakitani | 315/209 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,212,428 | 5/1993 | Sasaki et al. | 315/308 |

Primary Examiner—Benny Lee
Assistant Examiner—Haissa Philogene
Attorney, Agent, or Firm—Sughrue, Mion, Zinn, Macpeak & Seas

[57] ABSTRACT

Disclosed is a lighting circuit for a vehicular lamp which cuts off power supply to the discharge lamp when the discharge lamp flickers due to the expiration of its service life or the like, thus ensuring safety for an approaching vehicle. In the lighting circuit for a metal halide lamp, when a lighting switch is set on, the battery voltage is boosted by a DC booster circuit and is then converted into an AC voltage by a DC/AC converter. This AC voltage is applied to the metal halide lamp. An abnormality detector is provided to detect that the lamp gets into a flickering state. When the output voltage of the DC booster circuit becomes greater than a threshold value after a predetermined wait time elapses from the point at which the output voltage has exceeded the threshold value, the abnormality detector determines this situation as abnormal lighting and sends a signal to a power cutoff relay circuit to stop supplying the battery voltage to the DC booster circuit.

22 Claims, 6 Drawing Sheets

CUT-OFF VEHICULAR DISCHARGE LAMP CIRCUIT HAVING WAIT AND MONITOR MODES

BACKGROUND OF THE INVENTION

1. Field of the Invention

The present invention relates to a novel lighting circuit for a vehicular discharge lamp, which detects the flickering of a discharge lamp due to the expiration of its service life or the like and cuts off the power supply to the discharge lamp, thereby ensuring the safe driving to approaching vehicles.

2. Description of the Related Art

Compact metal halide lamps have recently been receiving greater attention as a light source that can replace an incandescent lamp. A known lighting circuit for a vehicular metal halide lamp uses a DC power source, boosts the DC input voltage by a booster circuit and then converts the boosted voltage into an AC voltage of a sine waveform or rectangular waveform by a DC/AC (Direct Current to Alternate Current) converter before applying the voltage to the metal halide lamp.

When the discharge lamp keeps flickering due to the expiration of the service life during driving, the flickering may dazzle the driver of an approaching vehicle. Driving the vehicle with the flickering discharge lamp is dangerous and may result in serious accidents. The conventional lighting circuit is not however designed to properly cope with such a situation.

SUMMARY OF THE INVENTION

In is therefore an object of the present invention to provide a lighting circuit for a vehicular discharge lamp, which detects the flickering of the discharge lamp due to the expiration of its service life or the like and cuts off the power supply to the discharge lamp.

To acheive the foregoing and other objects and in accordance with the purpose of the present invention, there is provided a lighting circuit for a vehicular discharge lamp for cutting off power supply to the discharge lamp when detecting an abnormal state of the discharge lamp from a detected level of a tube voltage of the discharge lamp or a signal equivalent to the tube voltage, which circuit comprises abnormality detecting means for detecting flickering of the discharge lamp; and power cutoff means for cutting off power supply to the discharge lamp when receiving a signal indicating an abnormal state of the lighting circuit from the abnormality detecting means.

When this structure, the flickering of the discharge lamp is detected by detecting the level of the tube voltage of the discharge lamp or a signal equivalent to the tube voltage, and power supply to the discharge lamp is stopped when the flickering state is detected. This can prevent the driver of an approaching vehicle to be dazzled by continuous flickering, thus improving the driving safety.

DETAILED DESCRIPTION OF THE PREFERRED EMBODIMENT

A preferred embodiment of a lighting circuit for a vehicular discharge lamp according to the present invention will be described in detail below with reference to the accompanying drawings. The illustrated embodiment of this invention is a lighting circuit of a rectangular-wave triggering system.

Figure 1:
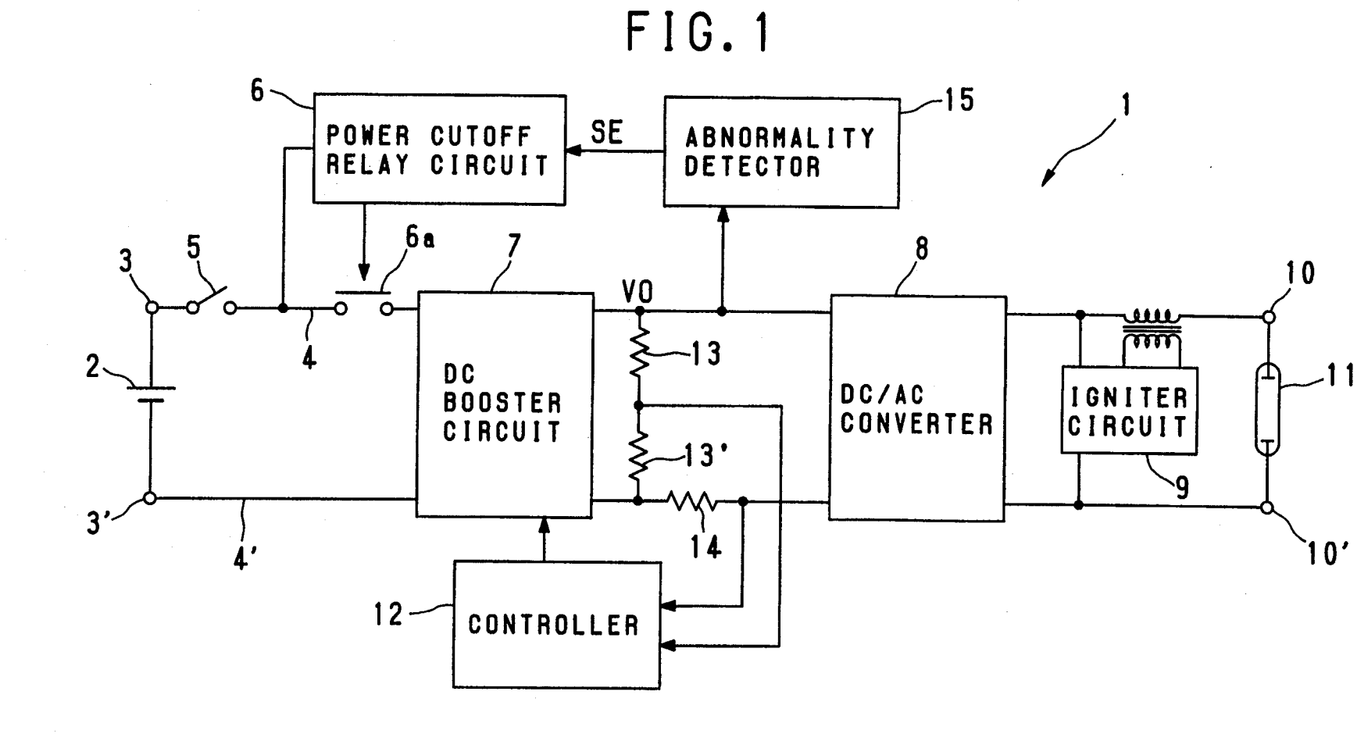
FIG. 1 is a block diagram schematically illustrating a lighting circuit for a vehicular discharge lamp according to one embodiment of this invention.

FIG. 1 presents schematic illustration of a lighting circuit 1 for a vehicular discharge lamp. The lighting circuit 1 has a battery 2, connected between DC voltage input terminals 3 and 3', a lighting switch 5, a power cutoff relay circuit 6, a DC booster circuit 7, a DC/AC converter 8, an igniter circuit 9, a controller 12, and an abnormality detector 15.

Reference numerals 4 and 4' denote DC power supply line. The lighting switch 5 is inserted in the positive power line 4.

A relay contact 6a is provided on the positive power line 4, and is open and closed by a power cutoff relay circuit 6. That is, the power supply cutoff relay circuit 6 serves to cut off the supply of a battery voltage to circuits at the subsequent stages when abnormality in the lighting circuit 1 is detected or the relay circuit 6 receives a detection signal from the abnormality detector 15, which will be described in detail later.

The DC booster circuit 7 has its positive input terminal connected to the output terminal of the relay contact 6a and the other ground input terminal connected to the DC voltage input terminal 3'.

The DC booster circuit 7 serves to boost the battery voltage under the control of the controller 12 which will be described in detail later.

The DC/AC converter 8 is provided at the subsequent stage of the DC booster circuit 7 to convert the DC voltage from the booster circuit 7 into an AC voltage of a rectangular waveform. A bridge type driving circuit is used for this DC/AC converter 8.

The igniter circuit 9 is provided at the subsequent stage of the DC/AC converter 8. A metal halide lamp 11 having rated power of 35 W is connected between AC output lines 10 and 10' of the igniter circuit 9.

The controller 12 serves to control the output voltage of the DC booster circuit 7. The controller 12 receives a voltage detection signal corresponding to the output voltage of the of DC booster circuit 7 which is detected by voltage-dividing resistors 13 and 13' provided between the output terminals of the DC booster circuit 7.

The controller 12 also receives a current detection signal, which corresponds to the output current of the DC booster circuit 7 converted into a voltage form by a current-detecting resistor 14, provided on a ground line which connects the DC booster 7 and DC/AC converter 8.

The controller 12 generates control signals according to these detection signals, and sends the control signals to the DC booster circuit 7 to control the output voltage of the circuit 7, thereby performing power control matching the status of the metal halide lamp 11 at the time of activation. This control can shorten the activation time and reactivation time.

The abnormality detector 15 detects that the metal halide lamp 11 flickers due to the expiration of its service life or the like and sends a detection signal (denoted by "SE") to the power cutoff relay circuit 6, stopping the supply of the source voltage to the DC booster circuit 7 from the battery 2.

The detection of the flickering status is accomplished by using the output voltage (denoted by "VO") of the DC booster circuit 7 as follows. A monitor time is provided, which starts from the point at which the output voltage VO exceeds a threshold value and continues for a predetermined time. When the output voltage VO exceeds the threshold value in the monitor time, it is detected as the flickering of the metal halide lamp 11.

At the time the metal halide lamp 11 flickers, the peak voltage of the output voltage VO exceeds the threshold value. As the output voltage VO temporarily increases immediately after the lighting of the metal halide lamp 11 in the normal state starts, one cannot simply take the situation of the output voltage VO exceeding the threshold value as the flickering of the metal halide lamp 11. In this respect, the monitor time for the output voltage VO is provided for a given period of time after the output voltage VO exceeds the threshold value for the first time.

Figure 2:
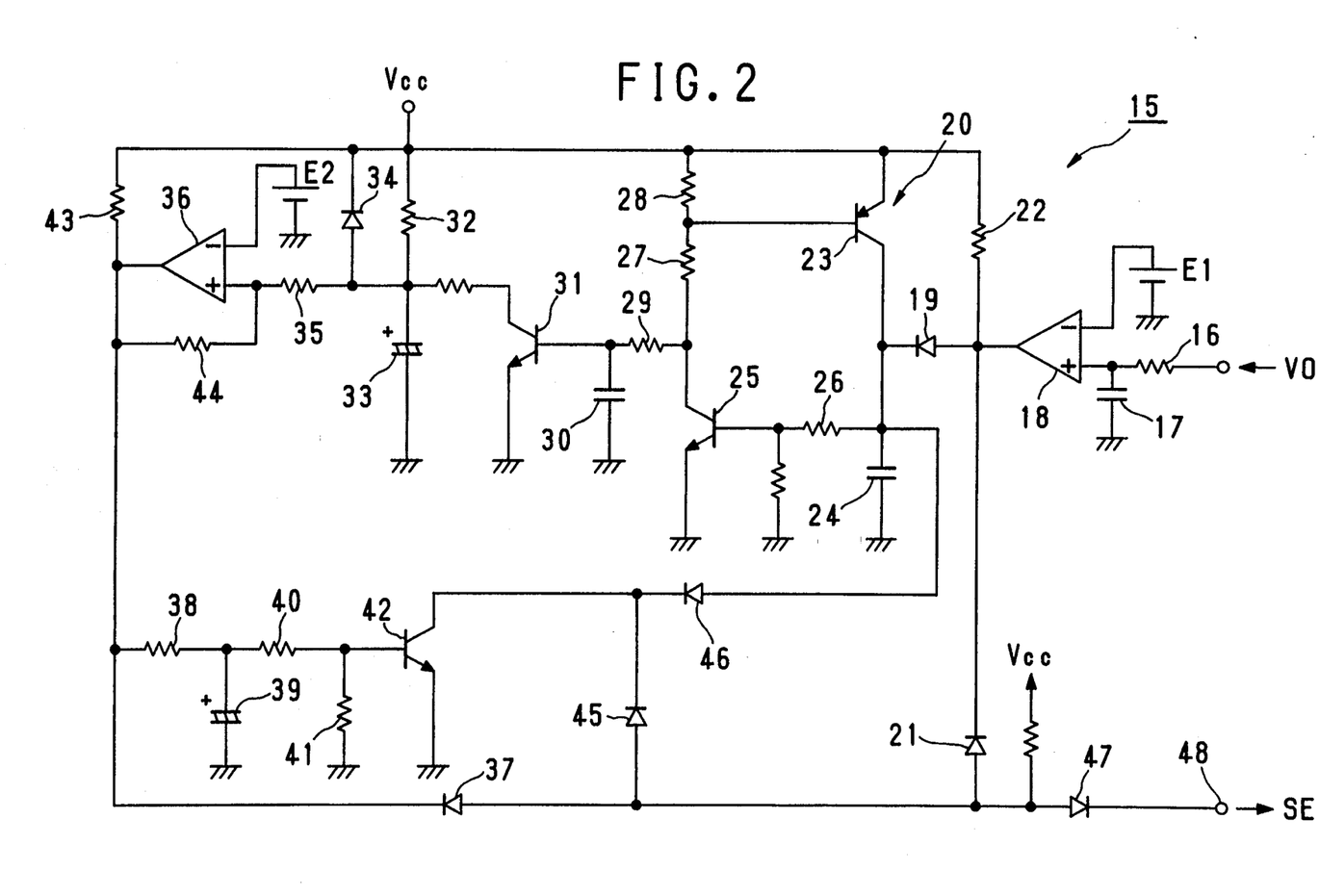
FIG. 2 is a block diagram exemplifying the structure of an abnormality detector.

FIG. 2 shows an example of the constitution of the abnormality detector 15.

The output voltage VO of the DC booster circuit 7 is sent via a resistor 16 and a capacitor 17 to the non-inverting input terminal of an operational amplifier 18, which constitutes a comparator. The operational amplifier 18 also receives a predetermined reference voltage E1 at its inverting input terminal. The result of the comparison between the output voltage VO and the reference voltage E1 is sent via a diode 19 to a hold circuit 20 located at the subsequent stage. The output terminal of the operational amplifier 18 is connected to the cathode of a diode 21 which constitutes an AND gate. The output terminal of the operational amplifier 18 is also connected via a pull-up resistor 22 to a power terminal Vcc.

In the hold circuit 20, an emitter-grounded PNP transistor 23 has its collector connected to the cathode of the diode 19 and is grounded via a capacitor 24. An emitter-grounded NPN transistor 25 has its base connected via a resistor 26 to the collector of the PNP transistor 23, and has its collector connected via resistors 27 and 28 to the power terminal Vcc. The node between the resistors 27 and 28 is connected to the base of the PNP transistor 23. A resistor is inserted between the base and emitter of the transistor 25.

The collector of the transistor 25 is further grounded via a resistor 29 and a capacitor 30. An emitter-grounded transistor 31 has its base connected between the resistor 29 and the capacitor 30 and has its collector connected via a resistor between a resistor 32 and a capacitor 33.

The resistor 32 has one end connected to the power terminal Vcc and the other end grounded via the capacitor 33. A diode 34, provided in parallel to the resistor 32, has its cathode connected to the power terminal Vcc and has its anode connected via a resistor 35 to the non-inverting input terminal of an operational amplifier 36.

The operational amplifier 36, which constitutes a comparator, receives a predetermined reference voltage E2 at its inverting input terminal. The output terminal of the operational amplifier 36 is connected to the cathode of a diode 37 which constitutes an AND gate, and is also connected to the base of an NPN transistor 42 via a circuit consisting of resistors 40 and 41. The output terminal of the operational amplifier 36 is further connected via a pull-up resistor 43 to the power terminal Vcc, with a resistor 44 inserted between the output terminal and non-inverting input terminal of the amplifier 36.

The collector of the transistor 42 is connected to the cathode of a diode 45, which constitutes an AND gate, and to the cathode of a diode 46. The anode of the diode 46 is connected between the capacitor 24 and the resistor 26.

The anodes of the three diodes 21, 37 and 45 are connected together to the anode of a diode 47 whose cathode is connected to a detection output terminal 48. The anode of the diode 47 is also connected via a pull-up resistor to the power terminal Vcc.

In this abnormality detector 15, the comparator constituted of the operational amplifier 18 detects when the output voltage VO of the DC booster circuit 7 exceeds a threshold value corresponding to the reference voltage, and outputs a signal of a high (H) level when the output voltage VO goes beyond the threshold value. This signal is held by the hold circuit 20. As a result, the transistor 31 is turned off, charging the capacitor 33 via the resistor 32.

When the terminal voltage of the capacitor 33 rises and exceeds the reference voltage E2 of the operational amplifier 36 after the elapse of a certain period (hereinafter called "wait time" denoted by "Tw"), the output of the operational amplifier 36 becomes an H level. Consequently, the capacitors 39 is charged.

When a certain period (corresponding to the monitor time denoted by "Tm") elapses, the transistor 42 is turned on, releasing the signal-holding state of the hold circuit 20 through the diode 46.

Figure 4:
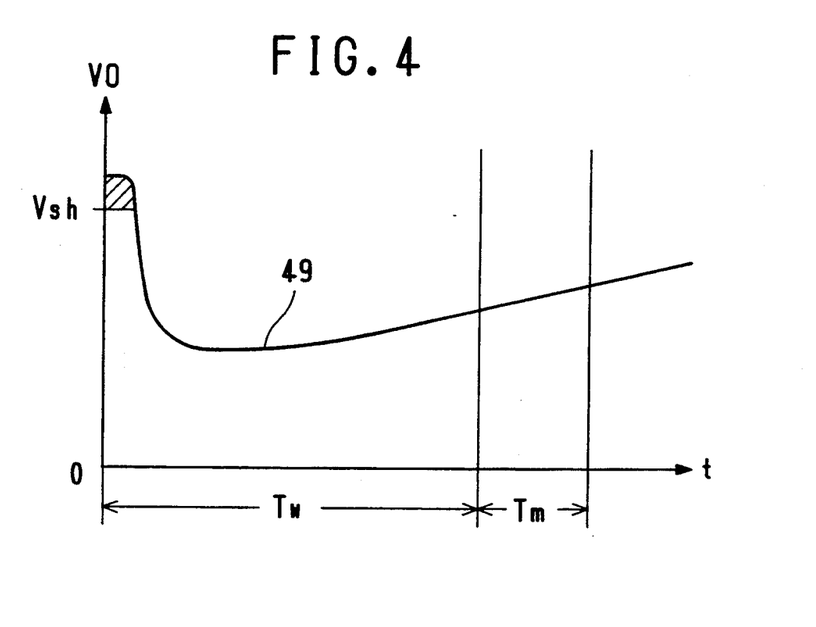
FIG. 4 is a graph showing a change in the output voltage VO of a DC booster circuit with time when the discharge lamp is normal.

FIG. 4 schematically illustrates a change in the output voltages VO of the DC booster circuit 7 with time when the metal halide lamp 11 is lit properly. The origin of the time is the point of time at which the lighting switch 5 is set on.

As apparent from the curve 49, immediately after the lighting switch 5 is set on, the output voltage VO is high and above the threshold value (denoted by "Vsh") for some period of time. When the lamp is lit thereafter, the output voltage VO drops temporarily and approaches to the normal value gradually. The shaded area in FIG. 4 indicates the region where the lamp has not been lit yet.

As the terminal voltage of the capacitor 33 is equal to or below the reference voltage E2 during the wait time Tw, the output of the operational amplifier 36 is at a low (L) level, rendering the diode 37 conductive so that the detection output is an L-level signal.

When the time enters the monitor time Tm, the output of the operational amplifier 36 becomes an H level. As the output of the operational amplifier 18 is at an L level, however, the diode 21 conducts and the detection output becomes an L-level signal.

When the monitor time Tm ends, the transistor 42 is turned on, resetting the hold circuit 20 through the diode 46, and the capacitors 33 and 39 are discharged.

Consequently, the abnormality detector 15 becomes a wait state until the output voltage VO exceeds the threshold value next.

It is apparent from the above that no H-level signal will appear on the output terminal of the abnormality detector 15 when the metal halide lamp 11 functions properly.

Figure 5:
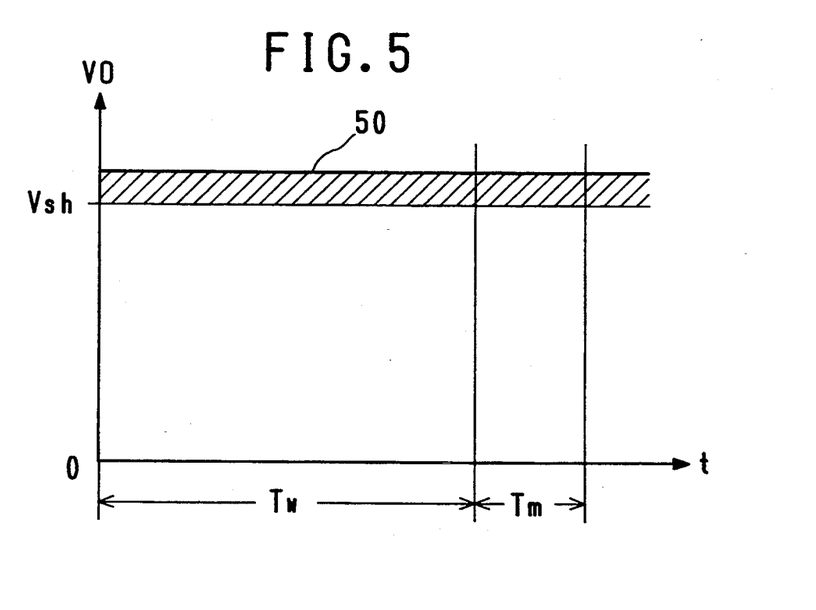
FIG. 5 is a graph showing a change in the output voltage VO of the DC booster circuit with time when the discharge lamp is in an open state.
Figure 6:
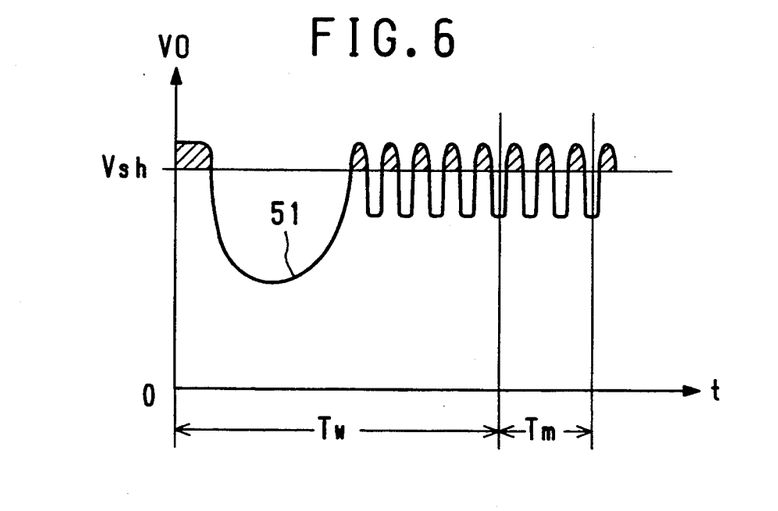
FIG. 6 is a graph showing a change in the output voltage VO of the DC booster circuit with time when the discharge lamp flickers.
Figure 7:
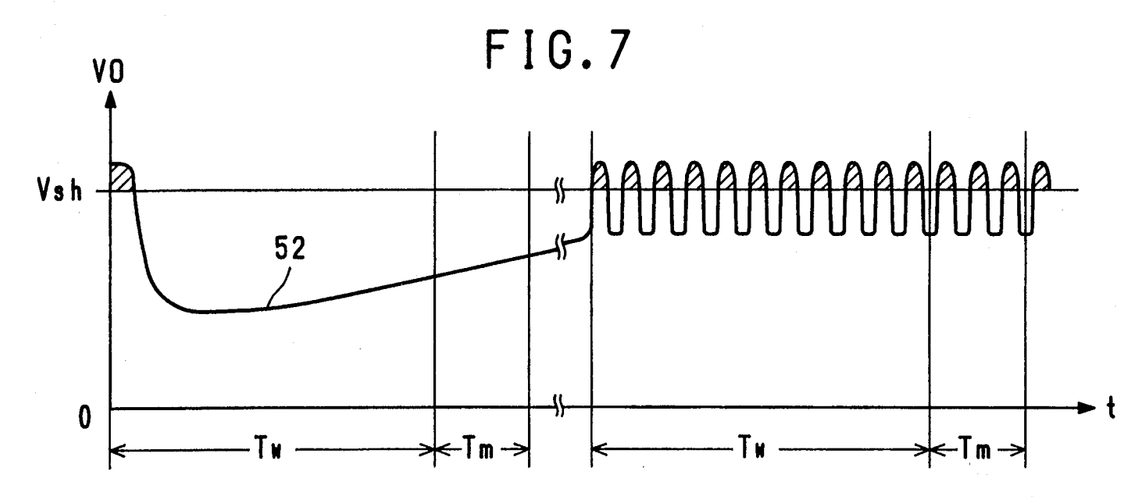
FIG. 7 is graph showing a change in the output voltage VO of the DC booster circuit with time when the discharge lamp starts flickering after it has been lit properly.

FIGS. 5 through 7 schematically illustrates changes in the output voltage VO of the DC booster circuit 7 with time when abnormality occurs in the metal halide lamp 11. FIG. 5 shows the case where the abnormality of the metal halide lamp 11 is detected immediately after the lighting switch 5 is set on, FIG. 6 shows the case where the metal halide lamp 11 keeps flickering at the initial lighting stage, and FIG. 7 shows the case where the metal halide lamp 11 has been properly lit once but the lamp 11 starts flickering later due to the occurence of some abnormality.

The origin of the time is the point of time at which the lighting switch 5 is set on. The shaded areas in those diagrams represent the region of VO>Vsh.

In FIG. 5, because the metal halide lamp 11 is in an open state from the beginning as apparent from the curve 50, the situation of the output voltage VO exceeding the threshold value Vsh continues for a long time immediately after the lighting switch 5 is set on. That is, VO>Vsh through the wait time Tw and the monitor time Tm.

In FIG. 6, it is apparent from the curve 51 that the output voltage VO temporarily exceeds the threshold value Vsh immediately after the lighting switch 5 is set on, and then the flickering is repeated from the point at which the output voltage VO drops. During the flickering state, the output voltage VO exceeds the threshold value Vsh when the metal halide lamp 11 is off and the output voltage VO drops below the threshold value Vsh when the metal halide lamp 11 is on. This flickering state starts during the wait time Tw and continues throughout the monitor time Tm.

In FIG. 7, it is apparent from the curve 52 that the normal lighting action is carried out at the beginning of the lighting as described earlier with reference to FIG. 4, and then the flickering occurs and continues through the next wait time Tw and monitor time Tm.

In any of the cases, the state of "VO>Vsh" is detected during the monitor time Tm after the wait time Tw elapses from the point at which the output voltage VO exceeds the threshold value Vsh for the first time. By the detection of that state, the abnormal lighting of the metal halide lamp 11 is detected.

During the wait time Tw, the detection output of the abnormality detector 15 becomes an L-level signal as in the normal state. But there is a point during the monitor time Tm that the output of the operational amplifier 18 becomes an H level. At this time, the diodes 21, 37 and 45 all become non-conductive and the diode 47 conducts, sending an H-level signal to the detection output terminal 48.

This signal is the abnormality detection signal SE which is sent to the power cutoff relay circuit 6 and held there. Consequently, the relay contact 6a provided on the power line is opened, stopping the lighting action of the metal halide lamp 11.

Figure 3:
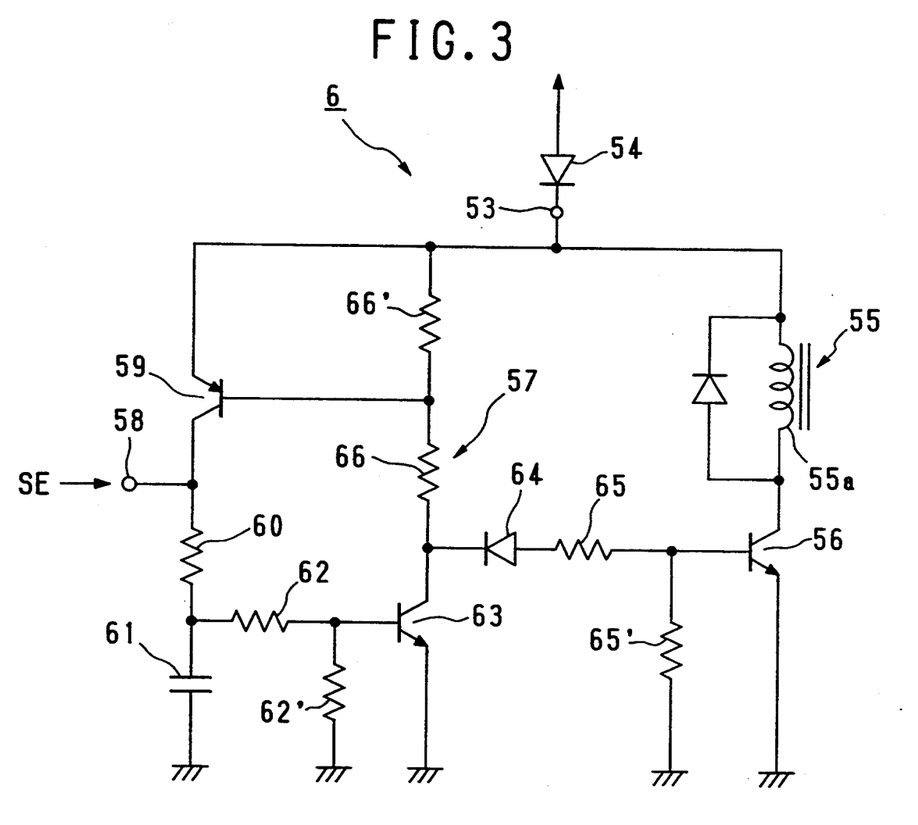
FIG. 3 is a block diagram exemplifying the structure of a power cutoff relay circuit.

FIG. 3 shows an example of the structure of the power cutoff relay circuit 6.

A power terminal 53 is connected via a reverse-flow preventing diode 54 to the output terminal of the lighting switch 5.

A relay 55 has a coil 55a whose one end is connected to the power terminal 53, the other end connected to the collector of an NPN transistor 56. The relay contact 6a is opened or closed in accordance with the exciting action of the coil 55a.

A signal holding circuit 57 has an input terminal 58 supplied with the aforementioned abnormality detection signal SE. When the input terminal 58 becomes an H level, this H-level state is held, turning off the transistor 56.

The input terminal 58 is connected to the collector of an emitter-grounded PNP transistor 59. This collector of the transistor 59 is grounded via a resistor 60 and a capacitor 61 and is connected to the base of an emitter-grounded NPN transistor 63 via the resistor 60 and a resistor 62. A resistor 62' is provided between the base and collector of the transistor 63.

The collector of the NPN transistor 63 is connected to the base of the aforementioned transistor 56 via a diode 64 and resistors 65 and 65', and is also connected to the power terminal 53 via resistors 66 and 66'. The node between the resistors 66 and 66' is connected to the base of the PNP transistor 59.

When an H-level signal or the abnormality detection signal SE is input to the input terminal 58, the transistors 63 and 59 are turned on and keep the state, and the transistor 56 is turned off.

Consequently, the relay 55 is set off, opening the relay contact 6a to stop the supply of the source voltage to the DC booster circuit 7.

This state will continue until the lighting switch 5 is set off and is then set on again.

If the metal halide lamp 11 keeps flickering due to the expiration of the service life or the like, the lighting circuit 1 stops power supply to the lamp 11 when the output voltage VO exceeds the threshold value Vsh during the monitor time Tm. It is therefore possible to prevent the continuation of undesirable conditions from the viewpoint of the traffic safety, such as dazzling the driver of an approaching vehicle which are caused by the continuous flickering of the metal halide lamp.

As apparent from the above description, according to the invention, the flickering of the discharge lamp is detected by monitored the tube voltage of the discharge lamp of a signal equivalent to that tube voltage, and power supply to the discharge lamp is cut off when such is detected. This invention can therefore avoid any inconvenient consequence of the continuation of the flickering state, such as dazzling the driver of an approaching vehicle.

The abnormality detecting means may be controlled in such a way that when detecting that the level of the tube voltage of the discharge lamp or its equivalent signal still becomes equal to or above a predetermined voltage during the monitor time after a predetermined wait time elapses from the point at which the level of that tube voltage or the equivalent signal has become equal to or above the predetermined voltage, the abnormality detecting means judges the situation as the abnormal state of the discharge lamp and sends a signal to the power cutoff means to stop supplying power to the discharge lamp. This control can reduce the frequency of the occurrence of erroneoud detection of the temporary rise of the tube voltage at the beginning of the lighting of the discharge lamp as an abnormal state.

Although only one embodiment of the present invention has been described herein, it should be apparent to those skilled in the art that the present invention may be embodied in many other specific forms without departing from the spirit or scope of the invention. For instance, although the supply of the battery voltage to the DC booster circuit is stopped when abnormality is detected in the above-described embodiment, the function of the DC/AC converter may be stopped instead. Further, this invention is not limited to a lighting circuit of a rectangular-wave triggering system, but may be applied to other various types of lighting circuits which employ other lighting systems, such as a sine-wave lighting system and a DC lighting system.

Therefore, the present examples and embodiment are to be considered as illustrative and not restrictive and the invention is not to be limited to the details given herein, but may be modified within the scope of the appended claims.

What is claimed is:

1. A lighting circuit for a vehicular discharge lamp for cutting off power supply to said discharge lamp when detecting an abnormal state of said discharge lamp, comprising:

means for detecting a level of a tube voltage of said discharge lamp or a signal equivalent to said tube voltage;

abnormality detecting means having a wait period mode and a monitor period mode of operation and operable to detect abnormal operation of said discharge lamp in response to said detected level, said abnormality detecting means commences said wait period mode of operation when said detected level is equal to or above a predetermined value and, after a predetermined time elapses, enters said monitor period mode of operation, said detecting means outputting a signal when said level is above said predetermined value during said monitor period mode; and power cutoff means for cuttign off power supply to said discharge lamp in response to said output signal received from said abnormality detecting means.

2. The lighting circuit according to claim 1, further comprising a DC/AC current converting means for converting a DC voltage into an AC voltage and supplying said AC voltage to said discharge lamp.

3. The lighting circuit according to claim 2, further comprising:

a DC booster circuit, connected to said DC/AC converting means, for boosting an input DC voltage;

an igniter circuit; and an control circuit for controlling an output voltage of said DC booster circuit, whereby said DC/AC converting means converts an output DC voltage from said DC booster circuit into an AC voltage and supplies said AC voltage of said igniter circuit.

4. The lighting circuit according to claim 1, wherein said power cutoff means includes a power cutoff relay circuit having a relay contact for cutting off power supply to said discharge lamp when abnormality is detected.

5. The lighting circuit according to claim 1, wherein said abnormality detecting means includes:

a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor.

a hold circuit connected via a diode to an output terminal of said operational amplifier; and a second operational amplifier having an inverting input terminal supplied with a second reference voltage, and an output terminal connected to said power terminal via a second pull-up resistor, with a resistor inserted between said output terminal and a non-inverting input terminal of said second operational amplifier.

6. The lighting circuit according to claim 2, wherein said power cutoff means includes a power cutoff relay circuit having a relay contact for cutting off power supply to said discharge lamp when abnormality is detected.

7. The lighting circuit according to claim 2, wherein said abnormality detecting means includes:

a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor;

a hold circuit connected via a diode to an output terminal of said operational amplifier; and a second operational amplifier having an inverting input terminal supplied with a second reference voltage, and an output terminal connected to said power terminal via a second pull-up resistor, with a resistor inserted between said output terminal and a non-inverting input terminal of said second operational amplifier.

8. The lighting circuit according to claim 3, wherein said power cutoff means includes a power cutoff relay having a relay contact for cutting off power supply to said discharge lamp when abnormality is detected.

9. The lighting circuit according in claim 3, wherein said abnormality detecting means includes:

a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor;

a hold circuit connected via a diode to an output terminal of said operational amplifier; and a second operational amplifier having an inverting input terminal supplied with a second reference voltage, and an output terminal connected to said power terminal via a second pull-up resistor, with a resistor inserted between said output terminal and a non-inverting input terminal of said second operational amplifier.

10. The lighting circuit according to any one of claims 2 to 9, wherein said AC voltage from said DC/AC converting means has a rectangular waveform.

11. The lighting circuit according to any one of claims 2 to 8, wherein said AC voltage from said DC/AC converting means has a sine waveform.

12. A lighting circuit for a vehicular discharge lamp for cutting off power supply of said discharge lamp when detecting an adnormal state of said discharge lamp from a detected level of a tube voltage of said discharge lamp or a signal equivalent to said tube voltage, said circuit comprising:

abnormality detecting means for detecting flickering of said discharge lamp, said abnormality detecting means entering a wait period mode of operation upon detecting that said level of said tube voltage of said discharge lamp or said equivalent signal is equal to or above a predetermined voltage, and switching to a monitor mode of operation a predetermined time thereafter, said abnormality detecting means generating an abnormality signal upon detecting that said level of said tube voltage of said discharge lamp or said equivalent signal is equal to or above a predetermined value during said monitor period of mode operation; and power cutoff means for cutting off power supply to said discharge lamp when receiving said abnormality signal indicating an abnormal state of said lighting circuit from said abnormality detecting means.

13. The lighting circuit according to claim 12, further comprising:

a DC/AC current converting means for converting a DC voltage into an AC voltage and supplying said AC voltage to said discharge lamp;

a DC booster circuit, connected to said DC/AC converting means, for boosting an input DC voltage;

an igniter circuit; and a control circuit for controlling an output voltage of said DC booster circuit, whereby said DC/AC conversing means converts an output DC voltage from said DC booster circuit into an AC voltage and supplies said AC voltage to said igniter circuit.

14. The lighting circuit according to claim 12, wherein said power cutoff means includes a power cutoff relay circuit having a relay contact for cutting off power supply to said discharge lamp when adnormality is detected.

15. The lighting circuit according to claim 12, wherein said abnormality detecting means includes:

a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor;

a hold circuit connected via a diode to an output terminal of said operational amplifier; and a second operational amplifier having an inverting input terminal supplied with a second reference voltage, and an output terminal connected to said power terminal via a second pull-up resistor, with a resistor inserted between said output terminal and a non-inverting input terminal of said second operational amplifier.

16. The lighting circuit according to claim 13, wherein said power cutoff means includes a power cutoff relay circuit having a relay contact for cutting off power supply to said discharge lamp when abnormality is detected.

17. The lighting circuit according to claim 13, wherein said abnormality detecting means includes:

a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor;

a hold circuit connected via a diode to an output terminal of said operational amplifier; and a second operational amplifier having an inverting input terminal supplied with a second reference voltage, and an output terminal connected to said power terminal via a second pull-up resistor, with a resistor inserted between said output terminal and a non-inverting input terminal of said second operational amplifier.

18. The lighting circuit according to any one of claims 12 to 17, wherein said AC voltage from said DC/AC converting means has a rectangular waveform.

19. The lighting circuit according to any one of claims 12 to 17, wherein said AC voltage from said DC/AC converting means has a sine waveform.

20. A lighting circuit for a vehicular discharge lamp for cutting off power supply to said discharge lamp when detecting an abnormal state of said discharge lamp from a detected level of a tube voltage of said discharge lamp or a signal equivalent to said tube voltage, said circuit comprising:

abnormality defecting means for detecting flickering of said dicharge lamp in such a way that when detecting that said level of said tube voltage of said discharge lamp or said equivalent signal still becomes equal to or above a predetermined voltage during a monitor time after a predetermined wait time elapses from the point at which said level of said tube voltage or said equivalent signal has become equal to or above said predetermined voltage, said abnormality detecting means judges the situation as an abnormal state of said discharge lamp and sends a signal to said power cutoff means to stop supplying power to said discharge lamp, said abnormality detection means including, a first operational amplifier having a non-inverting input terminal connected to an output terminal of said DC booster circuit via a resistor and a capacitor, an inverting input terminal supplied with a reference voltage, and an output terminal connected to a cathode of a diode and connected to a power terminal via a first pull-up resistor, a hold circuit connected via a diode to an output terminal of said operational amplifier, and a second operational amplifier having an inverting input terminal supplied with a second reference voltage, and an output terminal connected to said power terminal via a second pull-up resistor, with a resistor inserted between said output terminal and a non-inverting input terminal of said second operational amplifier;

power cutoff means including a power cutoff relay circuit relay having a relay contact for cutting off power supply to said discharge lamp when receiving a signal indicating an abnormal state of said lighting circuit;

a DC/AC current converting means for converting a DC voltage into an AC voltage and supplying said AC voltage to said discharge lamp;

a DC booster circuit, connected to said DC/AC converting means, for boosting an input DC voltage;

an igniter circuit; and a control circuit for controlling an output voltage of said DC booster circuit, whereby said DC/AC converting means converts an output DC voltage from said DC booster circuit into an AC voltage and supplies said AC voltages to said igniter circuit.

21. The lighting circuit according to claim 20, wherein said AC voltage from said DC/AC converting means has a rectangular waveform.

22. The lighting circuit according to claim 20, wherein said AC voltage from said DC/AC converting means has a sine waveform.

* * * * *